(12) United States Patent
Tribble et al.

(10) Patent No.: US 8,182,737 B2
(45) Date of Patent: May 22, 2012

(54) FORMED FILM, METHODS AND APPARATUS FOR MANUFACTURING SAME, AND ARTICLES COMPRISING SAME

(75) Inventors: James D. Tribble, Richmond, VA (US); Rickey J. Seyler, Chesterfield, VA (US); Matthew J. O'Sickey, Powhatan, VA (US); Timothy L. Clark, Sullivan, IN (US)

(73) Assignee: Tredegar Film Products Corporation, Richmond, VA (US)

( * ) Notice: Subject to any disclaimer, the term of this patent is extended or adjusted under 35 U.S.C. 154(b) by 1520 days.

(21) Appl. No.: 11/198,772

(22) Filed: Aug. 5, 2005

(65) Prior Publication Data

US 2007/0031636 A1    Feb. 8, 2007

(51) Int. Cl.
*B29C 39/14* (2006.01)
*B29C 47/88* (2006.01)
*B65C 9/25* (2006.01)
*A61F 13/15* (2006.01)
*B32B 3/04* (2006.01)

(52) U.S. Cl. ............... 264/555; 264/211.13; 156/324; 604/368; 428/130

(58) Field of Classification Search .............. 264/555, 264/211.13; 428/130; 604/368; 156/324
See application file for complete search history.

(56) References Cited

U.S. PATENT DOCUMENTS

| | | | |
|---|---|---|---|
| 3,856,612 A * | 12/1974 | McGinnis, Jr. | 428/130 |
| 4,259,286 A | 3/1981 | Louis et al. | |
| 4,317,792 A * | 3/1982 | Raley et al. | 264/504 |
| 4,327,730 A | 5/1982 | Sorensen | |
| 4,364,723 A | 12/1982 | Louis et al. | |
| 4,463,045 A | 7/1984 | Ahr et al. | |
| 4,738,588 A * | 4/1988 | Field | 416/97 R |
| 4,797,246 A | 1/1989 | Reinke et al. | |
| 4,995,930 A | 2/1991 | Merz et al. | |
| 5,368,460 A * | 11/1994 | Weavil et al. | 425/72.1 |
| 5,437,546 A * | 8/1995 | Dupraz | 425/223 |
| 5,503,968 A * | 4/1996 | Lee | 430/532 |
| 7,214,174 B2 * | 5/2007 | Allen et al. | 493/418 |
| 2002/0104609 A1 * | 8/2002 | Thomas | 156/178 |

* cited by examiner

*Primary Examiner* — Christina Johnson
*Assistant Examiner* — Michael Piery

(57) ABSTRACT

Formed film, apparatus and methods for manufacturing formed film, and articles of manufacture are disclosed. Methods include controlled introduction of melt foldovers through modifying the surface area of a polymer melt curtain. Apparatus for same is also shown as are articles of formed film with melt foldovers.

13 Claims, 3 Drawing Sheets

FORMED FILM, METHODS AND APPARATUS FOR MANUFACTURING SAME, AND ARTICLES COMPRISING SAME

FIELD OF THE DISCLOSURE

The present disclosure is related to formed film, apparatus and methods for manufacturing formed film and articles incorporating formed film.

BACKGROUND OF THE DISCLOSURE

Formed film is used in the manufacture of many goods. It begins as a polymer (or polymers) extruded through a die. The polymer is extruded, forming a melt curtain, which is a relatively continuous flat surface.

The melt curtain starts crystallization or solidification of the polymer. This crystallized or solidified (depending upon the polymer) polymer may be referred to as a web or film. Treatment of that web or film (called film hereinafter) such as aperturing, etc., results in a formed film. The formed film may be used for any number of objects as desired, such as, for example, layers in laminates, etc.

It has been generally desired to maintain a smooth flow with little or no turbulence in the transition of the polymer from melt curtain to film. This results, without further treatment, in a formed film with a relatively uniform surface and/or appearance.

DETAILED DESCRIPTION OF THE PREFERRED EMBODIMENTS

The present preferred embodiments provide formed film and apparatus and methods for manufacturing formed film. Articles of manufacture are also taught herein.

The details of one or more embodiments of the invention are set forth in the accompanying drawings and the description below. Other features, objects, and advantages of the invention will be apparent from the description and drawings, and from the claims.

Formed film as used herein includes either or both nonelastic and elastic polymers, and any suitable nonelastic or elastic polymers may be used. Formed film comprises, in various embodiments, flat (two-dimensional) film, three-dimensional film, apertured and non-apertured, elastic and nonelastic.

Elastic polymers may comprise natural-polymeric materials and synthetic polymeric materials including isoprenes, butadiene-styrene materials, styrene block copolymers (e.g., styrene/isoprene/styrene (SIS), styrene/butadiene/styrene (SBS), or styrene/ethylene-butadiene/styrene (SEBS) block copolymers) olefinic elastomers, polyetheresters, polyurethanes, etc. In certain preferred embodiments, the elastomeric materials can comprise high performance elastomeric material such as Kraton® elastomeric resins from Kraton Polymers, Inc., which are elastomeric block copolymers. Other embodiments may use plastomerics such as ExxonMobil Corporation's Vistamaxx or Dow Chemical Company's Affinity.

Nonelastic materials may comprise any suitable material that is not elastic. It should be noted that a nonelastic may be treated so as to introduce elasticity through any suitable process. Examples of materials used include thermoplastic film material, such as polyethylene, polypropylene, ethylene vinyl acetate, polyester, polyamide, polylactic acid and other such polymeric materials.

Figure 1:
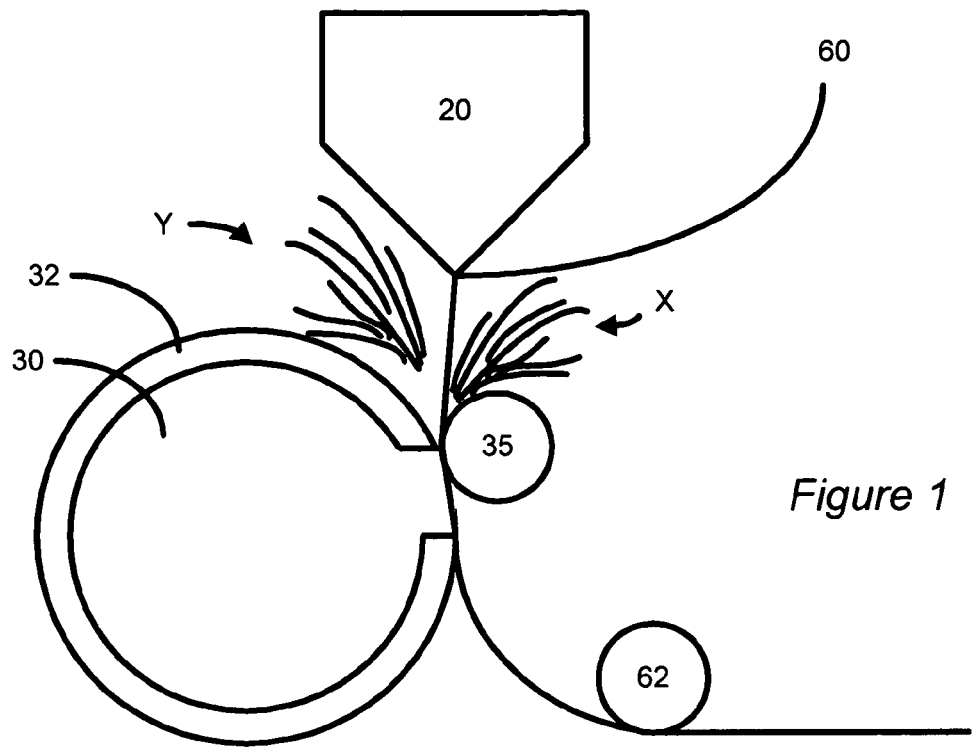
FIG. 1 shows a view of a preferred embodiment.

Turning now to FIG. 1, a view of a preferred embodiment is shown. FIG. 1 shows source 20, for providing polymer in the form of melt curtain 60. In this embodiment the polymer is a High Density Polyethylene (nonelastic) polymer. Source 20 comprises a slot die for extruding molten or semimolten polymer, however, in various embodiments, any suitable source may be used. The polymer may be a monolayer or multi-layer coextrusion structure. It may also be possible to provide a laminate, e.g., a polymer-nonwoven laminate, etc.

FIG. 1 also shows vacuum source 30. Vacuum source 30 is for providing a vacuum to a film in order to aperture, at least partially, the film, by providing a pressure to the film.

Figure 2:
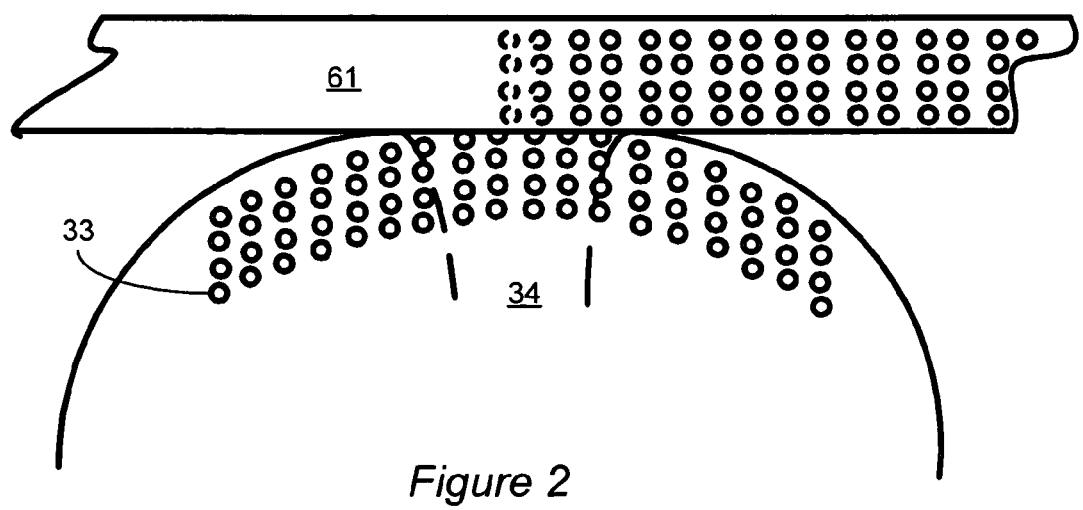
FIG. 2 shows a view of a preferred embodiment.

Turning briefly to FIG. 2, a view of a rupture process of a preferred embodiment is seen. Polymer 61 passes over screen 33, interposed between polymer 61 and vacuum 34. In this embodiment, screen 33 is comprised of 20 apertures per linear inch in a square pattern, referred to herein as 20 square. (Other suitable screens may be used in other embodiments. For example, screens may provide various percentages of open areas, aperture sizes, geometries, etc.)

When polymer 61 passes over screen 33, it is in a relatively contiguous melt curtain. The melt curtain is drawn to the negative pressure, passing through screen 33, imposed by vacuum 34. Thus, the melt curtain is drawn to the outer surface of screen 33, and apertures are formed in the melt curtain (which is rapidly solidifying as well into a film) as a result of the pressure imposed by vacuum 34. The strength of the vacuum is sufficient to stretch areas of the polymer by pulling those areas into the open areas or apertures in screen 33, where the areas of the polymer in the apertures of the screen will eventually be stressed beyond their stretch limit and rupture. The ruptures will occur along the pattern supplied by screen 33. As the melt curtain passes over the screen and solidifies, the apertures remain in their pattern.

The apertures in the film, in preferred embodiments, are three dimensional apertures. The apertures are provided in order to allow pass-through of air or other fluids as desired. Three-dimensional apertures are especially preferred in this embodiment and others where fluids are encountered in use of a polymer film and/or article. Embodiments may however, also use other suitable aperturing as desired. For example, embodiments may use a slitting, perforating, or other process instead of or in addition to a vacuum-screen aperturing source.

The preferred embodiments may also vary aperture patterns while maintaining generally consistent fluid pass-through volume in the film. For example, many smaller apertures may be desired in a film, while fewer larger apertures may be desired in another area of the same film. The use of varying patterns may not affect pass-through volume: e.g., many smaller apertures in a surface area may equate to a similar pass-through volume as fewer larger apertures in the same surface area.

Returning now to FIG. 1, melt curtain disruption device 35 is for providing a disruption or disruptions to the generally smooth flow of melt curtain 60. Any such disruption—referred to herein as melt Holdovers—will be "frozen" or fixed within the film as the film solidifies.

Figure 5:
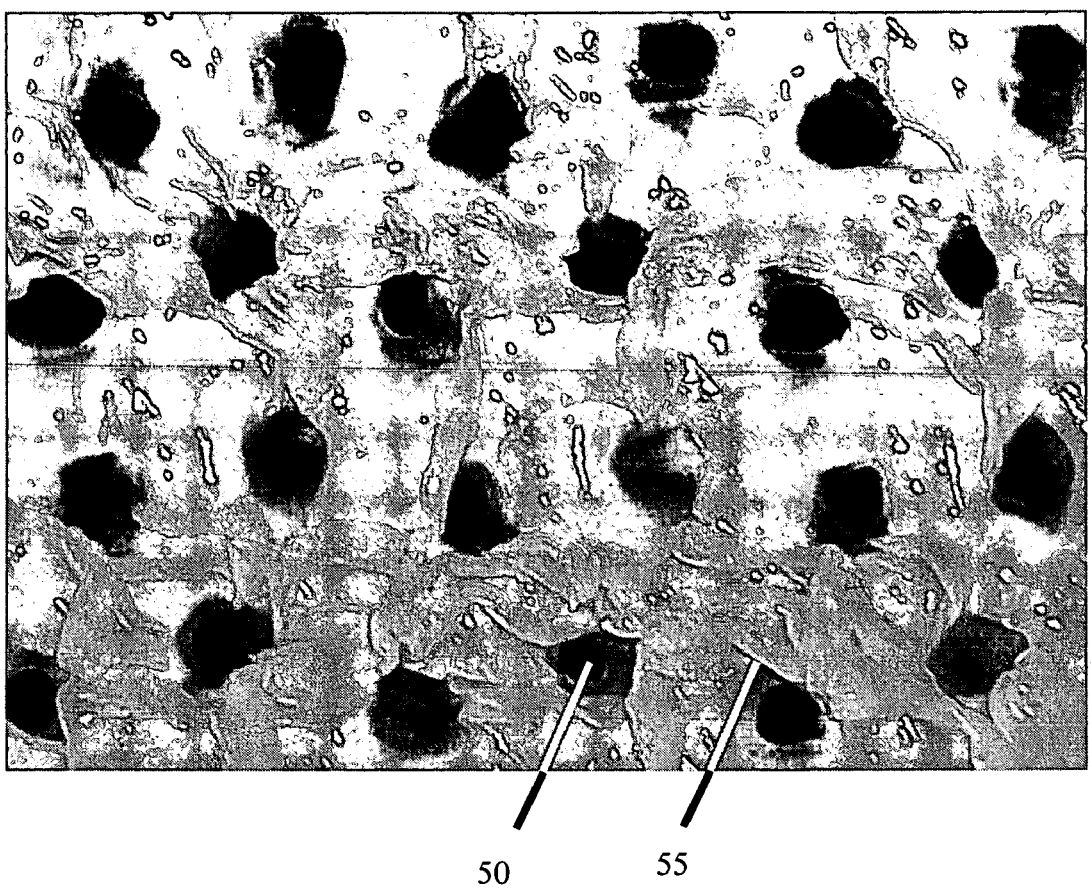
FIG. 5 shows a view of a preferred embodiment.

Turning briefly to FIG. 5, a scanning electron microscope view of an embodiment is seen. The aperturing is shown generally at 50, with a scattering of melt Holdovers at 55.

Returning now to FIG. 1, in preferred embodiments, melt curtain disruption device 35 is in the form of a device for affecting air pressure. The device of these preferred embodiments, e.g., a foil, (used herein as a word for any suitable device for directing air flow, e.g., an air foil, etc.) a roll, etc., affects ΔP, or the difference between air pressure surrounding the melt curtain. This effect causes turbulence on the melt curtain, and, as the melt curtain solidifies into a web, the turbulence becomes embodied in the web in melt Holdovers.

Generally, the creation of melt Holdovers using various embodiments, is done in a controlled manner, as is further described below. Melt foldovers may be in various shapes elevated from the plane of the web, e.g., folds, wrinkles, fibers, etc., —thus creating three-dimensional surface area in preferred embodiments. If desired, other embodiments may provide for two-dimensional melt Holdovers as well, creating two-dimensional surface area, such as for example in a relatively thin web.

Returning to FIG. 1, melt curtain disruption device 35, here a nip roll, used for lamination as well if desired, is for providing disruption to air flows and attendant creation of melt Holdovers, as melt curtain 60 is brought against screen 32. Air flow past melt curtain 60 into the vacuum chamber is disrupted at least in part by melt curtain disruption device 35 as air is partially blocked from directly flowing into the cavity. It should be noted that air flow present on the side of a polymer facing away from a screen is called the female side herein, and air flow on the side of a polymer facing toward a screen is called the male air flow herein. Therefore, in the embodiment shown in FIG. 1, air flow x is the male side air flow, and air flow y is the female side air flow.

It is believed and without promoting any particular theory of operation, that in various embodiments where disruption is provided to the female side air flow by a melt curtain disruption device, air flow is increased on the female side, over above air flow on the male side. This leads to a drop in pressure on the female side according to the Bernoulli effect. It may also be possible, again without promoting any theory of operation, that air flow becomes turbulent and thus the melt curtain is disrupted, through the transition from laminar flow on the female side to turbulent flow, as the melt curtain falls. . It should be noted that either of these theories, parts of the theories, both of the theories and/or other theories may explain the nature of disruption to air flow imposed by a melt curtain disruption device, and attendant creation of melt Holdovers, in various embodiments.

The ΔP, or differences between pressure on the male and female side of the melt curtain, may also be manipulated, in whole or part, in various embodiments, in order to create turbulence in a melt curtain. For example, a lesser pressure on the female side than the male side may cause bulging of the melt curtain sufficient to create melt Holdovers. Methods used to create the difference in various embodiments may include increasing air flow on the female side. As was further described above, this would lead to decreased pressure on the female side according to the Bernoulli principle. This decreased pressure means the ΔP would increase, and the melt curtain could bend and/or flutter as a result.

Other suitable means may also be used to increase the ΔP. For example, changing relative velocity on either male or female side, increasing pressure on a side, decreasing pressure on a side, etc.

Returning now to FIG. 1, the web passes roller 62, which is a chill roller. Of course, as is further described below, subsequent treatment in various embodiments may be as desired.

Figure 3:
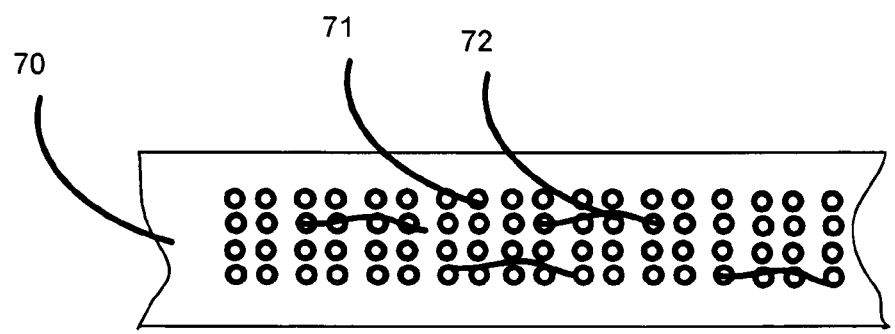
FIG. 3 shows a view of a preferred embodiment.

Turning briefly to FIG. 3, a view of a web embodiment is seen. Web 70 is shown with apertures 71 as well as melt Holdovers 72. Both apertures 71 and melt Holdovers 72 are three dimensional. In this embodiment, apertures 71 and melt Holdovers 72 are on the same side of web 70, however, in other embodiments, melt Holdovers may be on opposite sides of a web from apertures or on both sides of a web.

As was described above, male and female air flows may be caused to fluctuate through modification of various components often present in a formed film assembly. For example, as was described above, a nip roll, which may be used in a lamination process for a formed film, may also be used to affect air flow and thus cause desired turbulence in a melt curtain and subsequent formation of melt Holdovers. As another example, a patterned nip roll may be used to emboss a film. Depending upon the patterning, this may modify air flow, thus creating localized differences in the air flow and ΔP. Additionally, treatments such as embossing, etc. may be provided to a film that has or will be provided with melt Holdovers.

Figure 4:
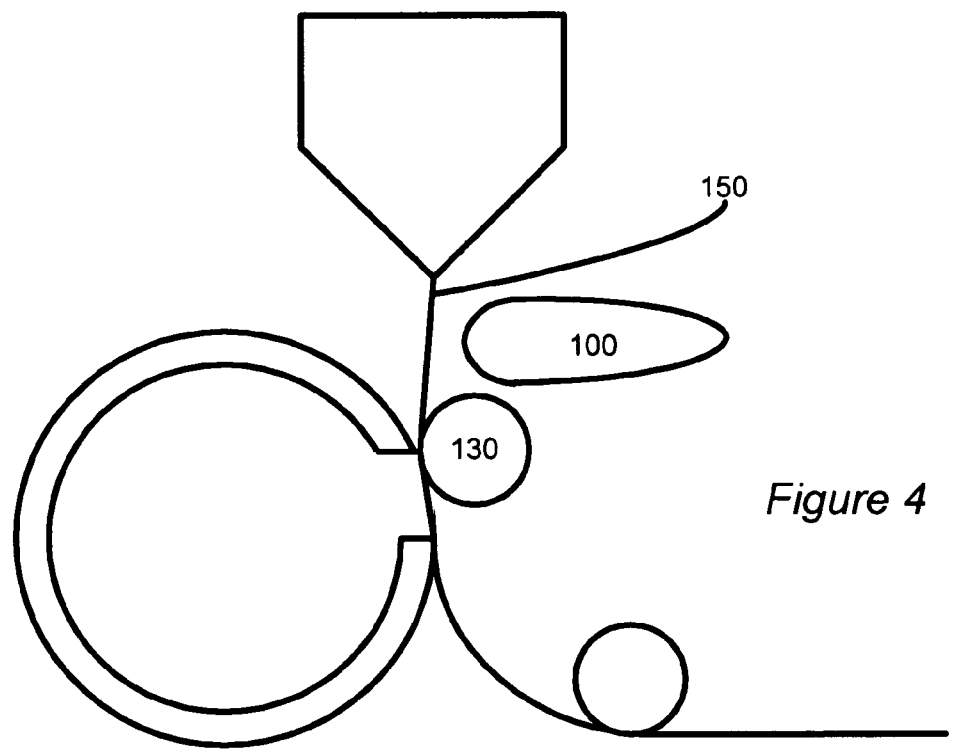
FIG. 4 shows a view of a preferred embodiment.

As another example, components may be added to those often present in a formed film assembly. For example, turning to FIG. 4, air foil 100 is shown above nip roll 130. Air foil 100 provides for a directed flow of air, along the female side of melt curtain 150. Both nip roll 130 and air foil 100 provide turbulence to melt curtain 150. Air foil 100 is adjustable as well, thus providing variable turbulence as desired.

Other components may be used in this and other embodiments to affect either or both the male and female side air flows, thus causing turbulence to occur in the melt curtain and attendant formation of melt Holdovers. These components are those suitable for affecting air flow in a dynamic system in any suitable ways or ways, e.g., external air jets, fans, blowers, foils, nozzles, passive and active air direction mechanisms, etc. In addition to or instead of providing components for affecting air flow in a dynamic system in any suitable ways or ways, embodiments may provide modified operating parameter settings in order to affect melt curtain surface area. For example, operating parameters such as temperature of the melt, speed of extrusion, distances between components, such as between a vacuum and melt curtain disruption device, component configuration (for example, modifying hole sizes and/or open area of any vacuum, modifying screen patterns, modifying any shape and design of a melt curtain disruption device, etc.) length of melt curtain, polymer and film formulation and physical characteristics (e.g., film thickness, lower melt strengths, etc.,) differential pressure value between male and female sides, basis weight, variations in the basis weight, thickness of melt curtain, relative angle of melt curtain to a screen and/or male and female air flows, etc. may also be desirably used to affect polymer surface area.

It should be noted that various parameters may counterbalance others—that is, in preferred embodiments, adjusting melt curtain length parameters to be longer may be counterbalanced by adjusting melt temperature to be cooler. Therefore, it should be noted that appropriately balancing parameters to achieve melt Holdovers in a desirably controlled environment is important. For example, modifying die to vacuum distance may modify male and/or female air flow required for turbulence, e.g., a further distance requiring a greater air flow and a lesser distance requiring a lesser air flow. For example, modifying screen to melt curtain disruption device distance may modify male and/or female air flow required for turbulence, e.g., a closer distance requiring a greater air flow and a further distance requiring a lesser air flow.

In addition to or instead of those embodiments set forth above, embodiments may provide for introduction of turbulence in the melt curtain through mechanical means, and subsequent creation of melt Holdovers. For example, one or more components may be to provide physical contact with the melt curtain so as to provide distortions, e.g., by drawing and then releasing regions of the melt curtain, thus creating melt Holdovers within the film. As other embodiments, electrostatic, ion currents, acoustic wave bombardment, vibration impact, bombardment, buffeting, etc. all may be used to provide for introduction of turbulence in the melt curtain through mechanical means and subsequent creation of melt Holdovers.

None of these examples are meant to be exclusive. That is, one or more example may be combined as desired. Additionally, if an air or vacuum type system is not used, (e.g., cast forming) those embodiments would provide either or both modified parameter settings in order to affect melt curtain surface area and/or for direct introduction of turbulence in the melt curtain through mechanical means, and subsequent creation of melt foldovers.

It should be noted that in any embodiment herein, the provision of melt foldovers is done in a controlled manner. Melt foldovers introduced by various embodiments may be as desired. For example, patterning and other desired attributes may also be provided. For example, a device in one area may provide one pattern of melt Holdovers, and a device in another area provide another desired pattern. Stretch characteristics may be imposed as well. So for example, regions of varying stretch and/or other characteristics (e.g. Breath ability) may be provided within a polymer. So for example, activation in-various preferred embodiments may be in various patterns, locations and/or orientations, in order to provide predetermined characteristics.

Localized melt Holdovers may be used in patterning, etc. as well. Embodiments may create these localized melt foldovers through any suitable method. For example, localized pressure differences ($\Delta P$) may cause localized melt foldovers.

The characteristics as imparted through melt foldovers may be varied as desired. For example, predetermined stretch characteristics may be provided through particular patterns, locations and/or orientations of melt foldovers. In other embodiments, the degree of melt foldover may itself be varied, for example, an area with smaller melt foldovers may be used to give a web a less rough appearance, perhaps for an area that is to be held, followed by an area with greater melt foldovers to give a web a rougher appearance, as for example in an area that will be used for surface scrubbing.

As another example, size, length, extent, and other physical characteristics of melt foldovers may be controlled. For example, melt foldovers may be desirably be of minimal width ("single fiber.") As another example, melt foldovers with differing characteristics may be provided on either side of the film. Of course, embodiments may select colors, color patterns, apertures and/or other types of patterns, etc.

For example, a color or colors may be used in certain embodiments so as to provide desired optical effects, e.g, color pattern or patterns, increased or decreased reflectivity, increased or decreased contrast, etc. through coloration of melt foldovers and/or the underlying film in whole or part. Thus tailoring of coloring characteristics of the film may be provided in various embodiments. Of course, using this and other techniques as shown herein may be accomplished in coextruded films, with resultant effects on a skin layer or layers as well as on core layer or layers. In coextruded films, coloration manipulation may lead to a perception of greater depth, increased contrast or other desired characteristics.

Melt foldovers may also be interposed, if desired, in order to provide fluid handling and other functional characteristics. Directional lanes, passageways, capillary type formations, etc. may be provided in various embodiments. For example, melt foldovers may be used to direct fluids, wick fluids, etc. when used as an Acquisition Distribution Layer, or in other fluid contacting applications.

In coextruded films, it may be desired in various embodiments to manipulate a skin layer or layers if desired. For example, in a coextruded film embodiment, the skin layer or layers may be chosen so as to provide for melt foldover creation, such as a thinner layer, polymer type, etc., thus providing a desirable texture to the skin layer or layers. Of course, further treatment of a web may be desired. For example, lamination of a web may be desired, in whole or part, using any suitable method, such as hot pin aperturing, adhesive bonding, thermal bonding, ultrasonic bonding, or any other suitable method, in any desired number of layers, and with any desired material(s.) For example, activation, in whole or part, using any suitable method, such as intermeshing gear activation (IMG,) ring rolling, uniaxial or biaxial orientation, etc. Activation may be in any direction desired, such as the machine direction (MD), transverse direction (TD) (also known as the cross direction (CD)), diagonally, a combination of directions, etc.

None of these examples are meant to be exclusive. That is, one or more example may be combined as desired. Various embodiments may be used, in whole or part, in various types of articles or parts of articles, such as, for example, cleaning materials, (e.g., mop heads, hand scrubs, sponges, cleaning surfaces, hard surface cleaners, etc.) as well as other disposable and/or multiple use products; e.g., packaging materials; protective covers; household; office; medical or construction materials; wrapping materials; antiskid mats, etc.

Embodiments may also be modified in any suitable fashion, for example, a polymer may be sewn, bonded, printed, cut, shaped, glued, fluted, sterilized, etc.

Although the present invention has been described with respect to various specific embodiments, various modifications will be apparent from the present disclosure and are intended to be within the scope of the following claims.

We claim:

1. A method of making a film comprising:
   extruding a continuous sheet of molten polymer from a die; introducing controlled turbulence into the continuous sheet of molten polymer to cause said continuous sheet of molten polymer to fold over on itself and create foldovers; contacting a forming member with the sheet of molten polymer containing the foldovers to make a film; and cooling the film to maintain the foldovers.

2. The method as in claim 1, wherein said forming member comprises a perforated screen and said film is subjected to vacuum to form an apertured film.

3. A method as in claim 1 wherein the turbulence is introduced by placing a disruption device in proximity to the molten sheet of polymer and between the die and the forming member.

4. A method as in claim 3 wherein said disruption device causes a change in air pressure at the molten sheet of polymer.

5. A method as in claim 4 wherein said disruption device is selected from a roll and a foil.

6. A method as in claim 5 wherein said disruption device is a nip roll.

7. A method as in claim 5 wherein said disruption device is an air foil.

8. A method as in claim 1 wherein the molten sheet of polymer comprises at least one thermoplastic polymer.

9. A method as in claim 8 wherein the thermoplastic polymer is selected from polyethylene, polypropylene, ethylene vinyl acetate, polyester, polyamide, polylactic acid, natural rubber, isoprene, butadiene-styrene copolymers, styrene block copolymers, olefinic elastomers, polyetherester, polyurethane, and mixtures thereof.

10. A method as in claim 9 wherein said lamination occurs simultaneously with said aperturing.

11. A method as in claim 2 further comprising the step of laminating the film to a web selected from a film and a nonwoven.

12. A method as in claim 9 wherein said molten sheet of polymer further comprises a colorant.

13. A method as in claim 1 wherein said molten sheet of polymer comprises at least two coextruded polymer streams.

* * * * *